(12) United States Patent
Ogasawara

(10) Patent No.: US 6,429,911 B1
(45) Date of Patent: Aug. 6, 2002

(54) LIQUID CRYSTAL PIXEL INTERPOLATING MECHANISM IN A LIQUID CRYSTAL PHOTO PRINTER

(75) Inventor: Mamoru Ogasawara, Ohmiya (JP)

(73) Assignee: Fuji Photo Optical Co., Ltd., Ohmiya (JP)

(*) Notice: Subject to any disclaimer, the term of this patent is extended or adjusted under 35 U.S.C. 154(b) by 0 days.

(21) Appl. No.: 09/534,236

(22) Filed: Mar. 23, 2000

(30) Foreign Application Priority Data

Mar. 26, 1999 (JP) .......................................... 11-082705

(51) Int. Cl.[7] .......................................... G02F 1/1325
(52) U.S. Cl. .......................................... 349/58; 349/60
(58) Field of Search .............................. 349/2, 3, 4, 58, 349/60

(56) References Cited

U.S. PATENT DOCUMENTS 4,810,058 A * 3/1989 Sangoji et al. .................. 349/2
5,026,145 A * 6/1991 Marui et al. .................... 349/2

FOREIGN PATENT DOCUMENTS

JP          8-227108          9/1996

* cited by examiner

*Primary Examiner*—James Dudek
(74) *Attorney, Agent, or Firm*—Clifford Chance Rogers & Wells LLP

(57) ABSTRACT

A liquid crystal pixel interpolating mechanism is provided in a liquid crystal photo printer, wherein an image displayed on a liquid crystal panel, which is constituted of a plurality of pixels arrayed in two-dimensional directions and at predetermined pitch dimensions, is projected through a projecting lens onto a photosensitive material and printed on the photosensitive material. The mechanism comprises a liquid crystal panel support member, which is supported with resilient members, and pushing device for pushing the liquid crystal panel support member. With the mechanism, a pixel shifting operation is capable of being performed with a simple constitution and accurately.

6 Claims, 6 Drawing Sheets

FIG. 4A
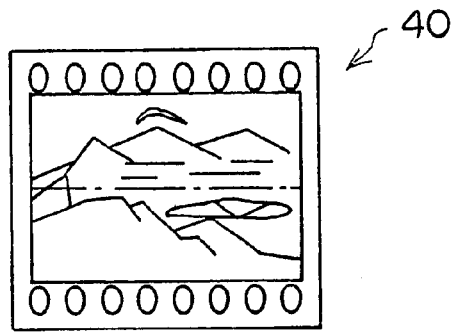
FIG. 4B
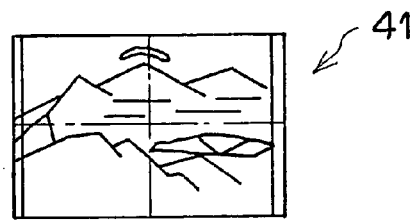
FIG. 4C

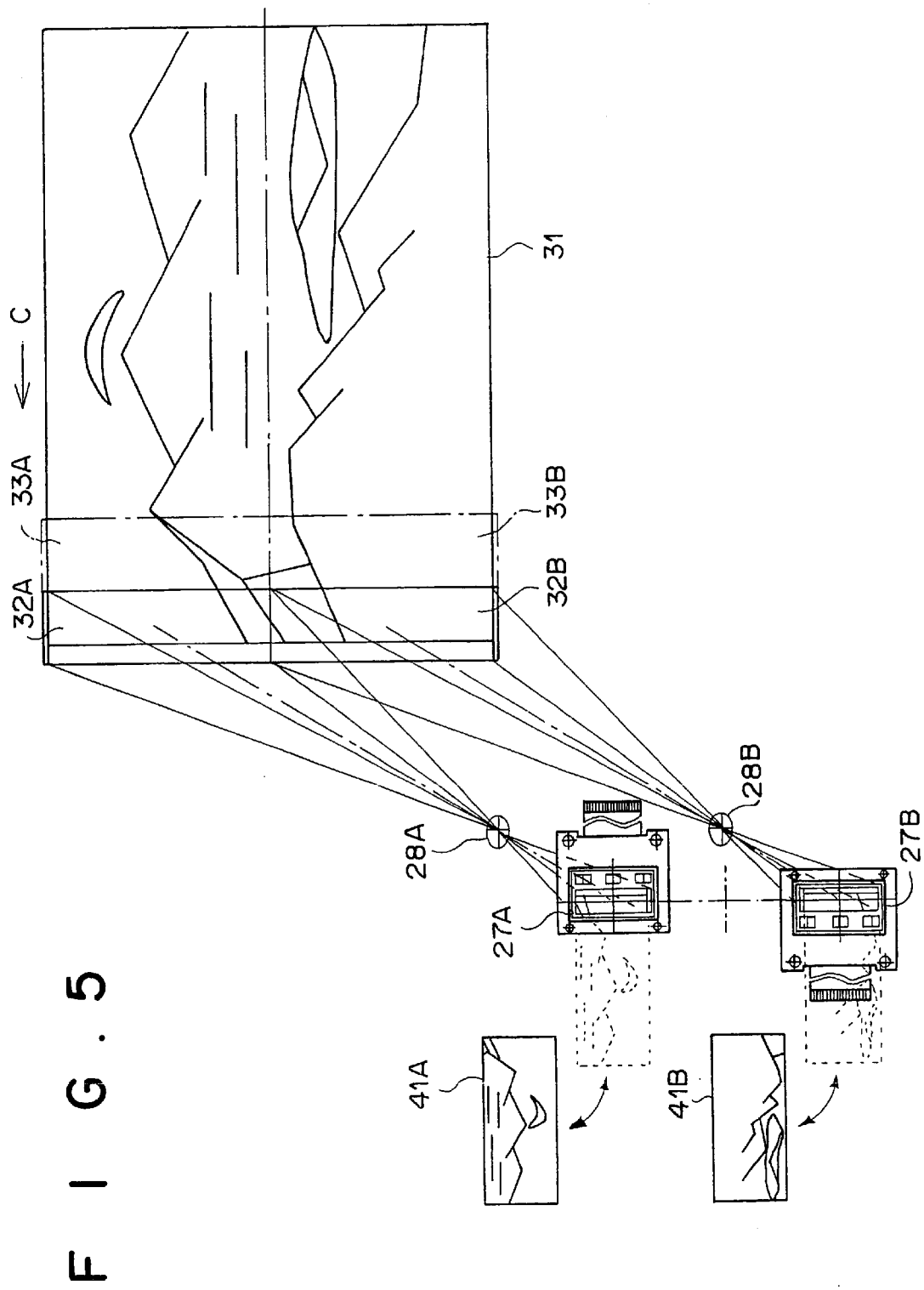

LIQUID CRYSTAL PIXEL INTERPOLATING MECHANISM IN A LIQUID CRYSTAL PHOTO PRINTER

BACKGROUND OF THE INVENTION

1. Field of the Invention

This invention relates to a liquid crystal pixel interpolating mechanism in a liquid crystal photo printer for projecting an image, which is displayed on a liquid crystal panel, through a projecting lens onto a photosensitive material and thereby printing the image on the photosensitive material.

2. Description of the Prior Art

Liquid crystal photo printers have heretofore been proposed. With the liquid crystal photo printers, image signals having been obtained by reading out images, which have been recorded in frames on negative film, with a scanner are stored in an image memory. An image signal representing an image of a frame, which image is to be printed, is read from the image memory and utilized for displaying the image on a liquid crystal panel. Also, the image displayed on the liquid crystal panel is projected onto photographic paper, and the photographic paper having thus been exposed image-wise is processed to form a print.

Also, index prints are often formed by printing the images of respective frames on negative film as printed images, which have reduced image sizes and are arrayed in a matrix-like form, such that it can be investigated easily what photographs have been taken on a roll of developed negative film. With the liquid crystal photo printers described above, in cases where the index prints are to be formed, image signals representing images having been recorded in several frames can be read from the image memory and utilized for displaying the images of the several frames on the liquid crystal panel, and the displayed images of the several frames can be projected onto the photosensitive material (the photographic paper). The photosensitive material having thus been exposed image-wise can then be processed to form an index print.

Also, with the liquid crystal photo printers described above, in cases where a print of a predetermined enlarged image size is to be formed, the entire area of the image of the frame to be printed can be displayed on the liquid crystal panel, the displayed image can be projected onto and formed on the photographic paper with a predetermined image size enlargement scale.

As described above, an image displayed on a liquid crystal panel, which is constituted of a plurality of pixels arrayed in two-dimensional directions and at predetermined pitch dimensions, may be projected through a projecting lens onto photographic paper with an image size enlargement scale, and an image having an enlarged image size may be printed on the photographic paper. However, as illustrated in FIG. 8, each pixel of the liquid crystal panel is constituted of a window W and an electrode area E. Therefore, in cases where a plurality of exposure dots D, D, . . . , which correspond to the pixels arrayed in, for example, a zigzag lattice-like form and at predetermined pitch dimensions, are formed on the photographic paper and in the form shown in FIG. 9, a projected image area corresponding to the window W becomes blackened, but a projected image area corresponding to the electrode area E remains white as an un-blackened area. Accordingly, the problems occur in that the maximum blackened image density cannot be kept high and a printed image having a high contrast cannot be obtained.

In order to eliminate the problems described above, a pixel shifting technique has been proposed in, for example, Japanese Unexamined Patent Publication No. 8(1996)-227108. With the pixel shifting technique, a liquid crystal panel is firstly located at a reference position, and an image displayed on the liquid crystal panel is projected onto a photosensitive material. Thereafter, the liquid crystal panel is displaced at least one time in a direction, which is normal to the exposure optical axis, such that the pixels of the liquid crystal panel may not overlap each other, and the exposure operation is again performed at the displaced position. In this manner, the un-blackened areas, which were formed on the photosensitive material in the first exposure operation, are blackened. Also, a technique has heretofore been employed, wherein the un-blackened areas are eliminated by the utilization of a polarizing plate formed from lithium niobate, or the like.

However, the pixel shifting technique described above has the drawbacks in that, since the liquid crystal panel is moved by the utilization of a piezo-electric device, the constitution cannot be kept simple. Also, the technique for eliminating the un-blackened areas by the utilization of the polarizing plate has the problems in that the polarizing plate is expensive and the exposure operation is apt to be adversely affected by dust, or the like.

SUMMARY OF THE INVENTION

The primary object of the present invention is to provide a liquid crystal pixel interpolating mechanism in a liquid crystal photo printer, wherein a pixel shifting operation is capable of being performed with a simple constitution.

Another object of the present invention is to provide a liquid crystal pixel interpolating mechanism in a liquid crystal photo printer, wherein a pixel shifting operation is capable of being performed accurately.

The present invention provides a liquid crystal pixel interpolating mechanism in a liquid crystal photo printer, wherein an image displayed on a liquid crystal panel, which is constituted of a plurality of pixels arrayed in two-dimensional directions and at predetermined pitch dimensions, is projected through a projecting lens onto a photosensitive material and printed on the photosensitive material, the mechanism comprising:

i) a liquid crystal panel support member, which is supported with resilient members, and ii) pushing means for pushing the liquid crystal panel support member.

In the liquid crystal pixel interpolating mechanism in a liquid crystal photo printer in accordance with the present invention, the pushing means may be constituted of a set-screw, whose end is in contact with the liquid crystal panel support member, and means for rotating the set-screw. Also, the resilient members should preferably form a parallelogrammic link. Further, the resilient members and the liquid crystal panel support member may be combined into an integral body.

With the liquid crystal pixel interpolating mechanism in a liquid crystal photo printer in accordance with the present invention, the liquid crystal panel support member is supported with the resilient members, and the pushing means is provided for pushing the liquid crystal panel support member. Therefore, when the liquid crystal panel support member is merely pushed by the pushing means, the resilient members become deflected, and the liquid crystal panel can be displaced. Accordingly, after the image displayed on the liquid crystal panel, which is located at a reference position, has been projected onto the photosensitive material and the photosensitive material is thus exposed image-wise, the liquid crystal panel support member is pushed by the pushing means, and the liquid crystal panel is thereby displaced from the reference position. At the position to which the liquid crystal panel has thus been displaced, the exposure operation is performed again. In this manner, a pixel shifting operation can be performed easily by the utilization of the simple and cheap mechanism.

In such cases, the distance of axial advance of the end of the set-screw is markedly short with respect to the rotation angle of the set-screw and is in proportion to the rotation angle of the set-screw. Therefore, with the liquid crystal pixel interpolating mechanism in a liquid crystal photo printer in accordance with the present invention, wherein the set-screw is employed in the pushing means, the distance of displacement of the liquid crystal panel can be set accurately.

Also, with the liquid crystal pixel interpolating mechanism in a liquid crystal photo printer in accordance with the present invention, wherein the resilient members form a parallelogrammic link, the liquid crystal panel can be translated in parallel from the reference position without being rotated. Therefore, the desired pixel shifting operation can be performed accurately.

Further, in cases where the resilient members and the liquid crystal panel support member are is formed as an integral body from, for example, a plastic material, the constitution for supporting the liquid crystal panel can be formed at a low cost and easily.

BRIEF DESCRIPTION OF THE DRAWINGS

FIG. 5 is an explanatory view showing how an image displayed on a liquid crystal panel is projected onto photographic paper to be exposed image-wise.

DESCRIPTION OF THE PREFERRED EMBODIMENTS

The present invention will hereinbelow be described in further detail with reference to the accompanying drawings.

Figure 1:
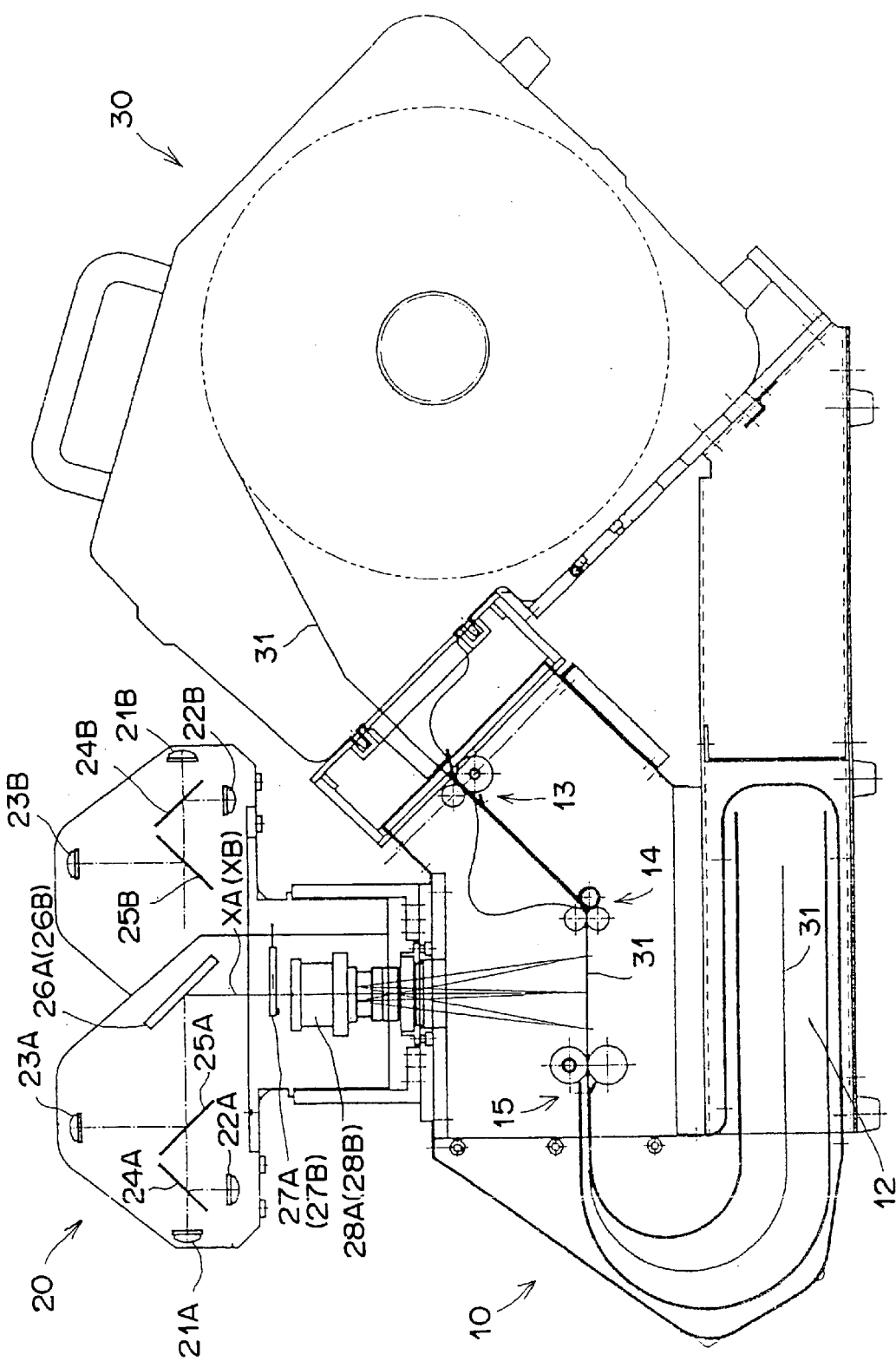
FIG. 1 is a schematic sectional view showing an example of a liquid crystal photo printer, in which the liquid crystal pixel interpolating mechanism in accordance with the present invention is employed.

FIG. 1 is a schematic sectional view showing an example of a liquid crystal photo printer, in which the liquid crystal pixel interpolating mechanism in accordance with the present invention is employed. With reference to FIG. 1, the liquid crystal photo printer comprises a main body 10, a light source optical section 20 mounted on the main body 10, and a paper magazine 30 mounted obliquely on the main body 10.

As light sources for exposure, the light source optical section 20 comprises a light emitting diode (hereinbelow referred to as the B-LED) 21A for producing a blue component of light and radiating it horizontally, a light emitting diode (hereinbelow referred to as the R-LED) 22A for producing a red component of light and radiating it upwardly, and a light emitting diode (hereinbelow referred to as the G-LED) 23A for producing a green component of light and radiating it downwardly. Dichroic mirrors 24A, 25A and a reflecting mirror 26A are located on the downstream side with respect to the direction of travel of the light having been radiated out of the B-LED 21A. The dichroic mirror 24A transmits the blue light, which has been radiated out of the B-LED 21A, and reflects the red light, which has been radiated out of the R-LED 22A. The dichroic mirror 25A transmits the blue light, which has been radiated out of the B-LED 21A, and the red light, which has been radiated out of the R-LED 22A, and reflects the green light, which has been radiated out of the G-LED 23A. The optical axes of the blue light, the red light, and the green light are caused to coincide with one another by the dichroic mirrors 24A and 25A. The directions of the optical axes of the blue light, the red light, and the green light are then changed downwardly by the reflecting mirror 26A so as to form an exposure optical axis XA.

A liquid crystal panel 27A is located below the reflecting mirror 26A. The liquid crystal panel 27A is located horizontally along a plane, which is normal to the exposure optical axis XA. The liquid crystal panel 27A comprises a plurality of pixels, which are arrayed regularly and which can display the white color, the black color, and intermediate colors with 256 levels of gradation by the utilization of electric means. A projecting lens 28A is located below the liquid crystal panel 27A. The projecting lens 28A projects an image, which is displayed on the liquid crystal panel 27A, onto photographic paper 31. The projecting lens 28A also alters the magnification ratio of a print formed by the exposure operation.

As described above, the light source optical section 20 comprises the optical elements (constituting an A set), which are represented by the reference numerals labeled A. The light source optical section 20 also comprises optical elements of a B set, which are basically identical with the optical elements of the A set and which are located at the rear of the optical elements of the A set in FIG. 1. The optical elements of the B set are represented by the corresponding reference numerals labeled B (i.e., 21B, 22B, . . . , 28B). The optical elements of the A set and optical elements of the B set are mounted in staggered location with respect to each other on the main body 10. The B-LED 21A, which belongs to the A set on the front side, radiates out the blue light toward the right, and the B-LED 21B, which belongs to the B set on the rear side, radiates out the blue light toward the left, such that the exposure optical axis XA of the A set and the exposure optical axis XB of the B set may coincide with each other along a line normal to the plane of the sheet of FIG. 1, i.e. such that the exposure optical axis XA of the A set and the exposure optical axis XB of the B set may be aligned with each other along the line, which is normal to the direction of conveyance of the photographic paper (the photosensitive material) 31.

The main body 10 comprises conveying rollers 13, 13, conveying rollers 14, 14, and conveying rollers 15, 15 for conveying the long photographic paper 31 from the paper magazine 30 to the position for exposure and conveying the photographic paper 31, which has been exposed, to a reservoir 12, and the reservoir 12 for accommodating the exposed photographic paper 31.

Figure 2:
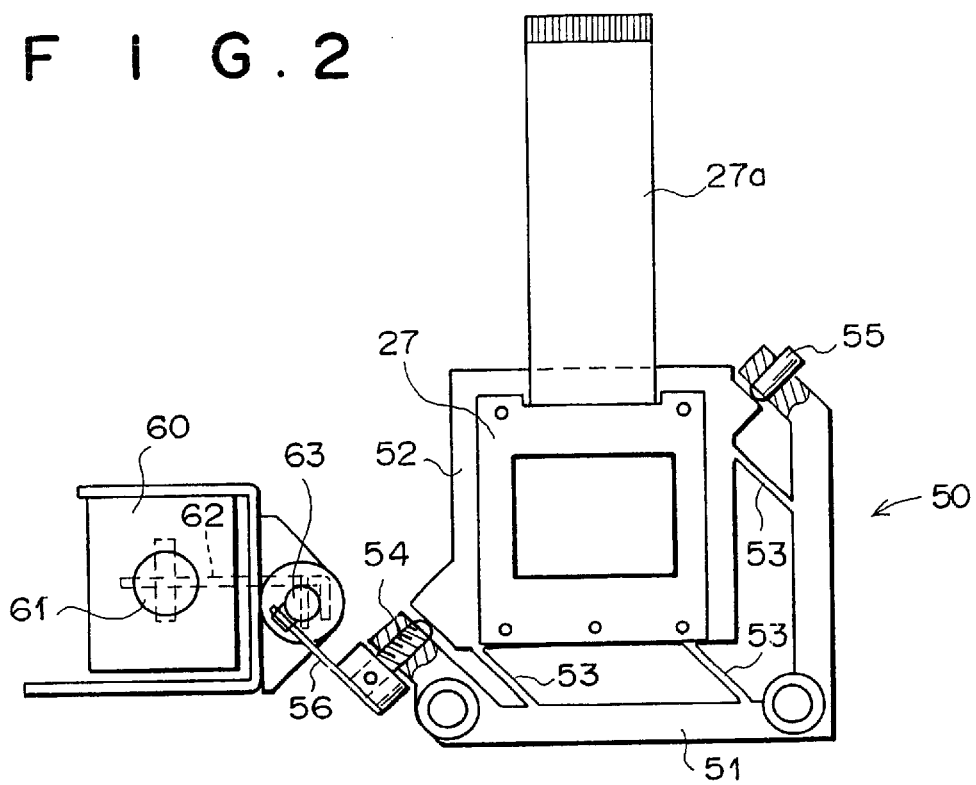
FIG. 2 is a partially sectional, partially cutaway plan view showing an embodiment of the liquid crystal pixel interpolating mechanism in accordance with the present invention.
Figure 3:
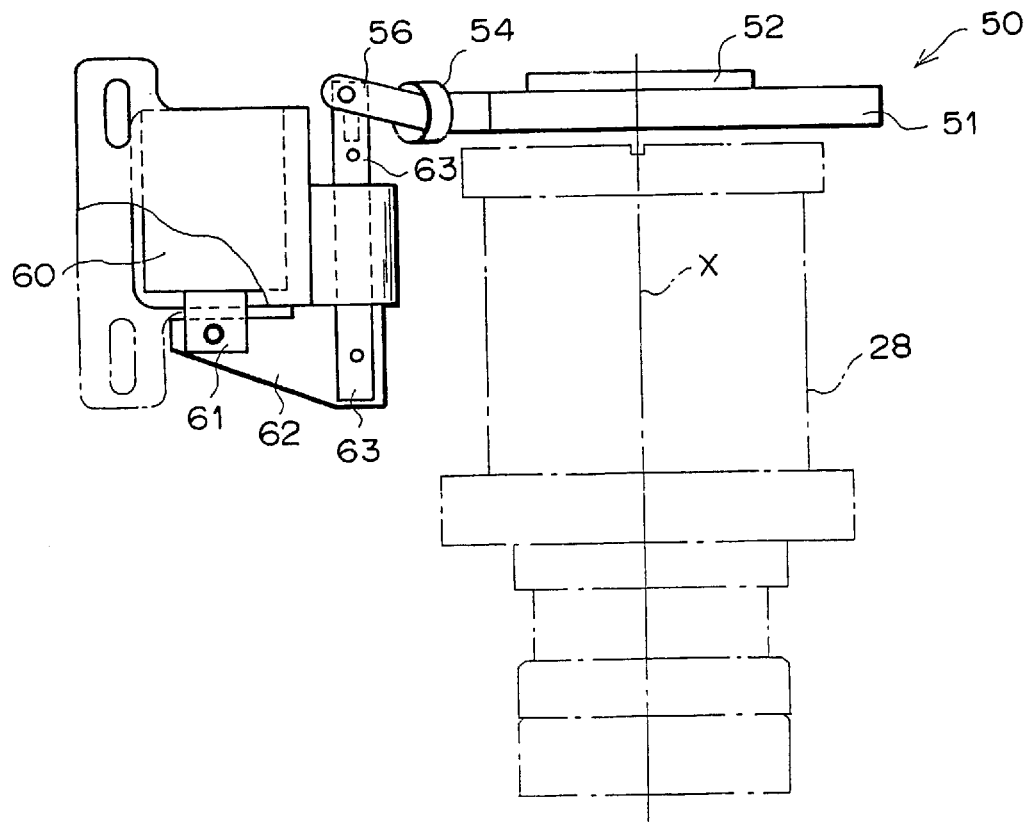
FIG. 3 is a side view showing the embodiment of FIG. 2, FIGS. 4A, 4B, and 4C are explanatory views showing how an original image is divided.

FIG. 2 is a partially sectional, partially cutaway plan view showing an embodiment of the liquid crystal pixel interpolating mechanism in accordance with the present invention. FIG. 3 is a side view showing the embodiment of FIG. 2. The mechanism shown in FIG. 2 and FIG. 3 is provided for each of the A set and the B set described above. Therefore, in FIG. 2 and FIG. 3, the labels A and B for the respective reference numerals are omitted.

With reference to FIG. 2 and FIG. 3, liquid crystal panel support means 50 is located just above the projecting lens 28, which is indicated by the single-dot chained lines in FIG. 3. The liquid crystal panel support means 50 comprises an L-shaped frame 51, which is secured to a case housing of the light source optical section 20, and a frame-like liquid crystal panel support member 52 for supporting the liquid crystal panel 27, to which a flexible flat cable 27*a* is connected. The liquid crystal panel support means 50 also comprises three elongated resilient members 53, 53, 53, which extend in parallel with one another and along the oblique direction and which connect the L-shaped frame 51 and the liquid crystal panel support member 52 at three connection points. The L-shaped frame 51, the liquid crystal panel support member 52, and the resilient members 53, 53, 53 are formed from an appropriate plastic material and are combined into an integral body. A set-screw 54 is fitted by threads into one end of the L-shaped frame 51, such that the set-screw 54 can advance and retract along a direction, which is normal to the direction of extension of each resilient member 53, as viewed in FIG. 2. The leading end of the set-screw 54 is in contact with the corner region of the liquid crystal panel support member 52. The set-screw 54 is imparted with back tension toward an initial position of rotation by a spring (not shown). A subsidiary ball plunger 55 is located at the other end of the L-shaped frame 51. The leading end of the ball plunger 55 is in contact with the corner region of the liquid crystal panel support member 52, which corner region is located on the diagonal line with respect to the corner region that is in contact with the set-screw 54. The ball plunger 55 thus urges the liquid crystal panel support member 52 toward the reference position which is in contact with the set-screw 54.

Therefore, when the set-screw 54 is rotated forwardly from the initial position of rotation so as to push the liquid crystal panel support member 52, the resilient members 53, 53, 53 are deflected, and the liquid crystal panel 27 is displaced from the reference position shown in FIG. 2 upwardly toward the right side in FIG. 2 and along the plane (the horizontal plane), which is normal to the exposure optical axis. In such cases, since the three resilient members 53, 53, 53 are formed in parallel with one another, two parallelogrammic links are formed by the three resilient members 53, 53, 53. As a result, the liquid crystal panel 27 is translated in parallel without being rotated. An operation lever 56 is secured to the head of the set-screw 54.

A solenoid 60, which acts as the driving source for rotating the set-screw 54, is located in the vicinity of the site of the liquid crystal panel support means 50, at which the set-screw 54 is located. A plunger 61 is associated with the solenoid 60. When the solenoid 60 is excited, the plunger 61 is moved to operate the operation lever 56 via linking members 62 and 63. As a result, the set-screw 54 is rotated by a predetermined angle, and the liquid crystal panel 27 is displaced from the reference position by a predetermined distance upwardly to the right side in FIG. 2.

When the solenoid 60 is set in the non-excited state, and the plunger 61 is returned to the original position, the set-screw 54 is returned to the initial position of rotation by the urging force of the spring (not shown). Also, the liquid crystal panel support member 52 is returned by the urging force of the ball plunger 55 to the reference position together with the liquid crystal panel 27.

How a printing operation is performed by the liquid crystal photo printer described above will be described hereinbelow with reference to FIGS. 4A, 4B, 4C, FIG. 5, FIGS. 6A, 6B, and FIGS. 7A, 7B.

Figure 9:
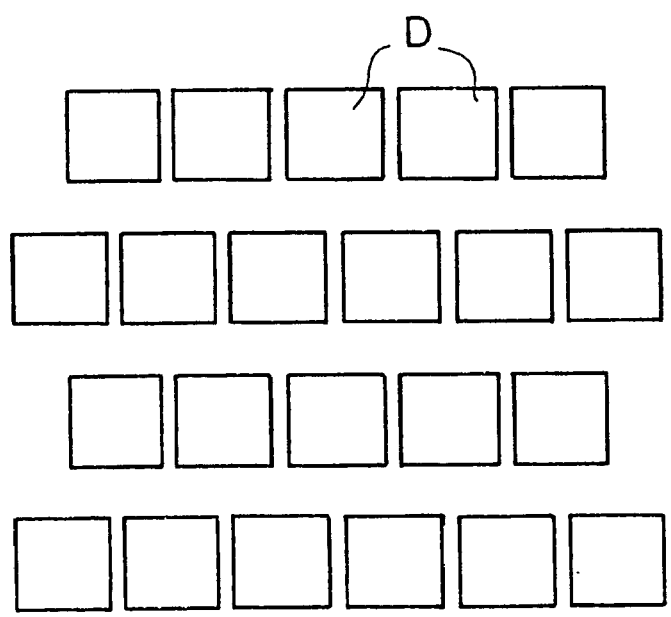
FIG. 9 is an explanatory view showing a pixel density in an image projected onto photographic paper.

Firstly, an original image 40, which has been recorded in a frame on negative film shown in FIG. 4A, is read as an image 41 into a scanner as illustrated in FIG. 4B. As illustrated in FIG. 4C, the image 41 is divided into an upper image 41A and a lower image 41B. Also, R, G, and B three-color image signals are formed from each of the image signals representing the images 41A and 41B. Further, as illustrated in FIG. 5, image display ranges of the image 41A on the liquid crystal panel 27A are equally divided with respect to the direction of conveyance of the photographic paper 31. In the same manner, image display ranges of the image 41B on the liquid crystal panel 27B are equally divided with respect to the direction of conveyance of the photographic paper 31. Thereafter, an image display range of the image 41A on the liquid crystal panel 27A is set so as to contain only an end image area with respect to the longer side direction of the image 41A. Also, an image display range of the image 41B on the liquid crystal panel 27B is set so as to contain only an end image area with respect to the longer side direction of the image 41B. While the photographic paper 31 is being kept stationary, pieces of three-color image information within the thus set image display range of the image 41A, which are represented by the R, G, and B image signals, are successively displayed on the liquid crystal panel 27A, and pieces of three-color image information within the thus set image display range of the image 41B, which are represented by the R, G, and B image signals, are successively displayed on the liquid crystal panel 27B. In synchronization with the successive displaying of the pieces of three-color image information, the set of the B-LED 21A and the B-LED 21B, the set of the R-LED 22A and the R-LED 22B, and the set of the G-LED 23A and the G-LED 23B are successively turned on. In this manner, the pieces of three-color image information displayed on the liquid crystal panel 27A and the pieces of three-color image information displayed on the liquid crystal panel 27B are successively projected onto the corresponding regions on the photographic paper 31 with the three exposure operations for the R, G, and B three colors. As a result, as illustrated in FIG. 9, the exposure dots D, D, . . . in the zigzag lattice-like form are printed on the photographic paper 31.

Figure 6A:
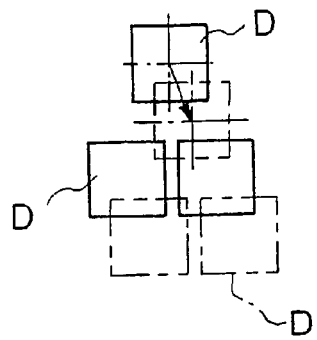
FIGS. 6A and 6B are explanatory views showing an example of a pixel shifting operation.
Figure 6B:
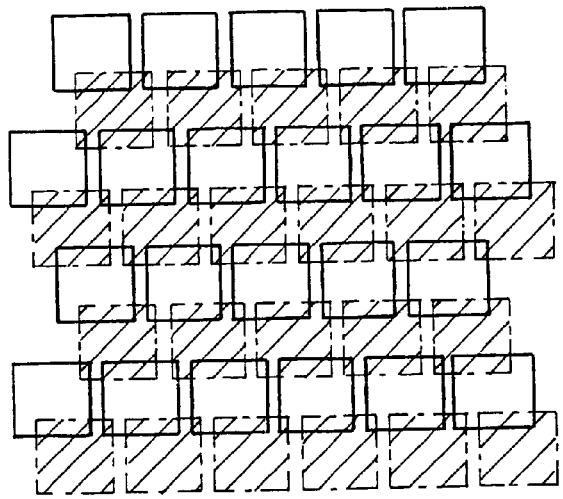
Figure 7A:
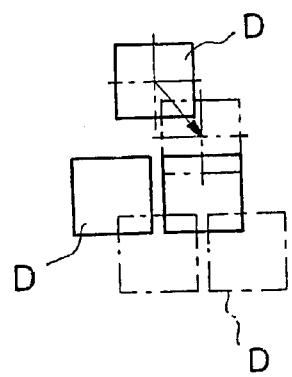
FIGS. 7A and 7B are explanatory views showing a different example of a pixel shifting operation.
Figure 7B:
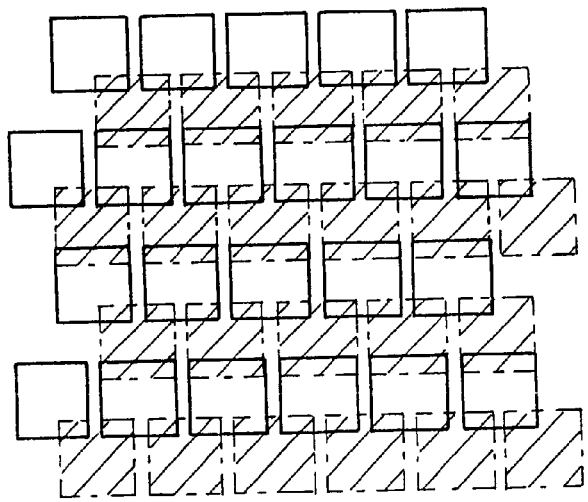
Figure 8:
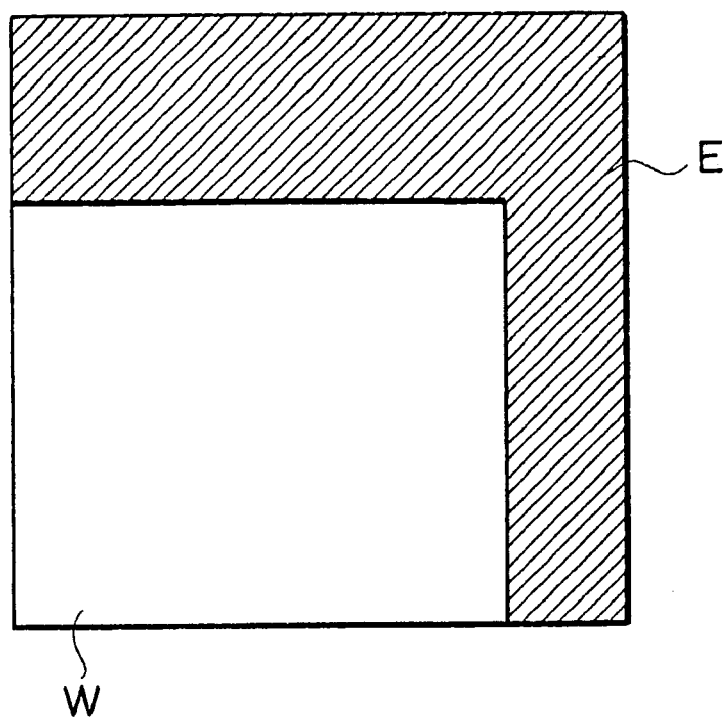
FIG. 8 is an enlarged view showing a pixel of a liquid crystal panel.

Thereafter, the solenoid 60 is excited, and the liquid crystal panels 27A and 27B are displaced from the reference positions to predetermined positions. The three exposure operations for the R, G, and B three colors described above are then iterated. As a result, the exposure dots D, D, . . . , which are indicated by the chained lines and the hatching in FIG. 6B or FIG. 7B, are printed. In this manner, the area between adjacent exposure dots D, D, which are indicated by the solid lines in FIG. 6B or FIG. 7B and which were formed by the exposure operations performed firstly at the reference position, is filled with a new exposure dot. The solenoid 60 is then set in the non-excited state, and the liquid crystal panels 27A and 27B are returned to the reference positions. As illustrated in FIGS. 6A and 7A, the direction of displacement of each of the liquid crystal panels 27A and 27B varies slightly between the cases shown in FIGS. 6A, 6B and the cases shown in FIGS. 7A, 7B. The cases shown in FIGS. 6A, 6B are of the gradation type, in which importance is attached to the gradation of the image. The cases shown in FIGS. 7A, 7B are of the contrast type, in which importance is attached to the contrast of the image.

As illustrated in FIG. 5, with the exposure operations performed firstly and secondly in the manner described above, exposed image regions 32A and 32B are formed on the photographic paper 31. Thereafter, the photographic paper 31 is conveyed by a predetermined distance along the direction indicated by the arrow C, such that the next adjacent regions of the images 41A and 41B, which regions are displayed respectively on the liquid crystal panels 27A and 27B, may be projected onto corresponding regions 33A and 33B of the photographic paper 31, which are adjacent to the exposed image regions 32A and 32B. The processing described above is iterated. Thereafter, the operations described above are iterated, and an enlarged print of the original image is thereby obtained.

As described above, with this embodiment, the liquid crystal panel support member 52 is supported by the L-shaped frame 51 via the resilient members 53, 53, 53. Also, the pushing means is provided, which comprises the set-screw 54 for pushing the liquid crystal panel support member 52 and the solenoid 60 for rotating the set-screw 54 by a predetermined angle. Therefore, when the solenoid 60 is excited, the set-screw 54 is rotated by a predetermined angle, and each of the liquid crystal panels 27A and 27B is displaced from the reference position to a predetermined position, while the resilient members 53, 53, 53 are being deflected. After the image displayed on each of the liquid crystal panels 27A and 27B at the reference position has been projected onto the photographic paper 31 for exposing it image-wise, the solenoid 60 is excited to displace each of the liquid crystal panels 27A and 27B from the reference position, and the exposure operation is again performed. In this manner, the pixel shifting operation can be performed easily by the utilization of the simple and cheap mechanism.

Also, since the set-screw 54 is employed in the pushing means, the distance of displacement of each of the liquid crystal panels 27A and 27B can be set easily and accurately.

Further, since the resilient members 53, 53, 53 form the two parallelogrammic links, each of the liquid crystal panels 27A and 27B can be translated in parallel from the reference position without being rotated. Therefore, the desired pixel shifting operation can be performed accurately.

Furthermore, the L-shaped frame 51, the liquid crystal panel support member 52, and the resilient members 53, 53, 53 can be formed from an appropriate plastic material and can be combined into an integral body. Therefore, the liquid crystal panel support means 50 can be formed easily and at a low cost.

What is claimed is:

1. A liquid crystal pixel interpolating mechanism in a liquid crystal photo printer, wherein an image displayed on a liquid crystal panel, which is constituted of a plurality of pixels arrayed in two-dimensional directions and at predetermined pitch dimensions, is projected through a projecting lens onto a photosensitive material and printed on the photosensitive material, the mechanism comprising:

i) a liquid crystal panel support member, which is supported with resilient members, and ii) pushing means for pushing the liquid crystal panel support member, the pushing means constituting a set-screw whose end is in contact with the liquid crystal panel support member, and means for rotating the set-screw.

2. A liquid crystal pixel interpolating mechanism in a liquid crystal photo printer, wherein an image displayed on a liquid crystal panel, which is constituted of a plurality of pixels arrayed in two-dimensional directions and at predetermined pitch dimensions, is projected through a projecting lens onto a photosensitive material and printed on the photosensitive material, the mechanism comprising:

i) a liquid crystal panel support member, which is supported with resilient members wherein the resilient members and the liquid crystal panel support member are combined into an integral body, and ii) pushing means for pushing the liquid crystal panel support member.

3. A liquid crystal pixel interpolating mechanism as defined in claim 1 wherein the resilient members form a parallelogrammic link.

4. A liquid crystal pixel interpolating mechanism as defined in claim 1 wherein the resilient members and the liquid crystal panel support member are combined into an integral body.

5. A liquid crystal pixel interpolating mechanism as defined in claim 3 wherein the resilient members and the liquid crystal panel support member are combined into an integral body.

6. A liquid crystal pixel interpolating mechanism in a liquid crystal photo printer, wherein an image displayed on a liquid crystal panel, which is constituted of a plurality of pixels arrayed in two-dimensional directions and at predetermined pitch dimensions, is projected through a projecting lens onto a photosensitive material and printed on the photosensitive material, the mechanism comprising:

i) a liquid crystal panel support member, which is supported with resilient members wherein the resilient members form a parallelogrammic link, and ii) pushing means for pushing the liquid crystal panel support member.

* * * * *